United States Patent
DeVito

(10) Patent No.: US 10,716,323 B2
(45) Date of Patent: Jul. 21, 2020

(54) OVERHEAD CONVEYOR AND WASH SYSTEM FOR CITRUS FRUIT OIL EXTRACTOR

(71) Applicant: John Peter DeVito, Winter Haven, FL (US)

(72) Inventor: John Peter DeVito, Winter Haven, FL (US)

(73) Assignee: Brown International Corp LLC, Winter Haven, FL (US)

( * ) Notice: Subject to any disclaimer, the term of this patent is extended or adjusted under 35 U.S.C. 154(b) by 314 days.

(21) Appl. No.: 15/932,410

(22) Filed: Feb. 27, 2018

(65) Prior Publication Data
US 2018/0249754 A1  Sep. 6, 2018

Related U.S. Application Data

(60) Provisional application No. 62/600,799, filed on Mar. 3, 2017.

(51) Int. Cl.
*A23N 1/00* (2006.01)
*B08B 3/02* (2006.01)

(52) U.S. Cl.
CPC .......... *A23N 1/003* (2013.01); *B08B 3/022* (2013.01); *B08B 3/024* (2013.01)

(58) Field of Classification Search
CPC .......... A23N 1/003; B08B 3/022; B08B 3/024
See application file for complete search history.

(56) References Cited

U.S. PATENT DOCUMENTS

| | | | | |
|---|---|---|---|---|
| 4,070,959 A | * | 1/1978 | Bushman | A23N 1/003 241/277 |
| 6,426,107 B1 | * | 7/2002 | Thomas | A23N 7/02 426/482 |
| 6,427,584 B1 | * | 8/2002 | Thomas | A23N 7/02 99/485 |
| 6,994,018 B2 | * | 2/2006 | Bushman | A23N 1/02 99/501 |
| 7,316,181 B2 | * | 1/2008 | Augusto | A23N 1/003 99/509 |
| 2003/0213379 A1 | * | 11/2003 | Augusto | A23N 1/003 99/495 |
| 2004/0007105 A1 | * | 1/2004 | Bushman | A23N 1/02 83/13 |
| 2006/0054189 A1 | * | 3/2006 | Luke | B08B 3/024 134/22.1 |
| 2006/0054202 A1 | * | 3/2006 | Luke | B08B 3/024 134/167 R |
| 2014/0150829 A1 | * | 6/2014 | Tibell | B08B 3/022 134/34 |

* cited by examiner

*Primary Examiner* — Bayan Salone
(74) *Attorney, Agent, or Firm* — Bruce H Johnsonbaugh

(57) ABSTRACT

An overhead conveyor and wash assembly is provided for a citrus oil extractor. In one embodiment, a spray manifold is connected to a drive chain and has nozzles for applying a cleaning solution and water to the extractor rollers. A wiper bar assembly is pendulously suspended from the spray manifold and conveys citrus fruits through the extractor as needed. The wiper bar assembly is moved to a raised position to be retracted to the input end of the extractor. A second embodiment uses a spray manifold pendulously suspended from drive chains and conveys citrus fruit through the extractor as needed and also sprays cleaning solution and water as needed.

14 Claims, 18 Drawing Sheets

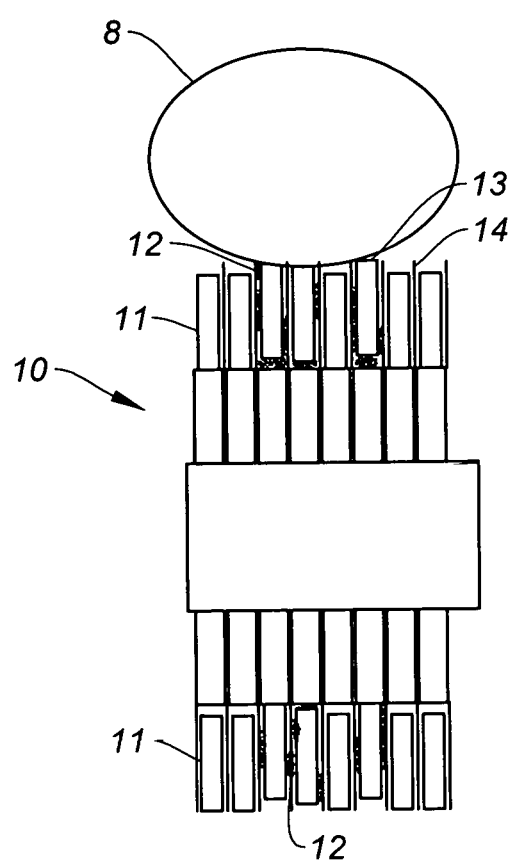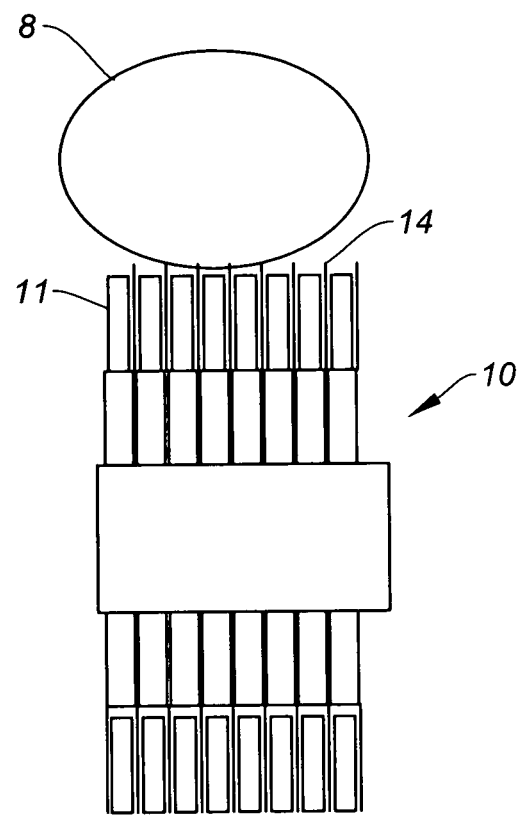
FIG. 1A
(Prior Art)
FIG. 1B
(Prior Art)

OVERHEAD CONVEYOR AND WASH SYSTEM FOR CITRUS FRUIT OIL EXTRACTOR

CROSS REFERENCE TO RELATED APPLICATION

This application claims the benefit of and priority based on U.S. provisional application 62/600,799 filed Mar. 3, 2017.

BRIEF BACKGROUND

The field of invention is the high speed, automatic extraction of oil from the peel or rind of citrus fruit. Such machines accumulate unwanted residues on rollers (or rolls) used to extract the oil. Those rollers require periodic cleaning, resulting in expensive downtime of the extractor. The present invention significantly reduces said downtime by providing a "self-cleaning" (or "clean in place") mode of operation, and increases efficiency of operation as well as safety of operation, as described below in greater detail. The present invention also includes another mode of operation in which a wiper bar periodically conveys or pushes citrus fruit through the extractor. This mode is utilized only when citrus fruit, for various reasons, remains on the rollers and it is necessary to push or convey the fruit through the extractor.

DETAILED BACKGROUND

The field of the invention relates to devices for the extraction of oil from citrus fruit. There is a worldwide demand for increasing the quantity of oil extracted from citrus fruits. The oils are generally extracted using one or more mechanical operations performed on the rind or peel of the particular fruit. One particular type of device for the extraction of oil from whole fruit is described in U.S. Pat. No. 4,070,959, incorporated by reference herein as though set forth in full, which uses a large number of parallel horizontal rollers (or rolls) with small sharp teeth mounted in a shallow rectangular tank. With this device in operation the toothed rolls are submerged underwater in order to allow oil which is removed from the rind of the fruit by the piercing action of sharp teeth to be captured by the water. The circulation of water in the tank and around the rolls in a direction opposite to the fruit flow produces an oil in water emulsion which is typically further processed through a straining device for removal of fruit debris and other large particles and then one or more stages of centrifuges for separation of the oil, water, and minute solid particles. The first stage centrifuge is typically a three phase separator which produces a "light phase" containing the bulk of the oil, a "middle phase" containing the bulk of the water, and a "sludge phase" containing the bulk of the solid particles which consists primarily of insoluble components such as minute particles and other debris removed from the fruit during the extraction of the oil. The sludge phase from the centrifuge is discarded to a waste stream whereas the "middle phase" from the centrifuge which contains the bulk of the water as well as some residual oil and solids are returned to the oil extractor to conserve on water usage.

The exact depth of penetration of roller teeth knife points into the rind of the peel is important with respect to the efficiency of oil extraction and is controlled by an annular washer placed between the toothed rings (knife points) as described in U.S. Pat. No. 4,070,959. The depth of penetration is regulated by the differential roll speed, in which the differential speed forces the fruit against the roll causing the sharp teeth of the toothed rings to penetrate oil glands in the peel or rind, whereas the annular washers limit the depth of penetration of the sharp teeth. The annular washers also have an important function of preventing the buildup of fruit debris such as peel bits, calyx buttons, and stem pieces on the teeth of the rings because each is free to move to a position tangent to the outer diameter of the toothed rings to dislodge any foreign matter.

The primary force causing the washers to move to the tangent position is from fruit 8 contact with the outer washer 11 (FIG. 1A). One particular problem with this approach is buildup of process residues 12 on the faces of the numerous annular washers 11 and toothed rings 14 which creates a resistance to the free movement of the annular washers and thus reduces penetration of the teeth into the rind of the fruit 13. Residues 12 can include waxes from the fruit surface, biofilms, and other organic and inorganic substances. In some cases, the residue buildup can become so severe that the annular washers become locked into position on the roll and will not move under the force of the citrus fruit 8 against them as shown at 13. This results in reduced removal of oil from the fruit and resulting in lower recovery of the valuable oil. In addition, the buildup of residues can also potentially be a source of contamination of the oil emulsions in the oil extractor such as with microorganisms which can cause compositional changes in the oil resulting in a degradation of overall flavor and aroma profile of the oil as well as reduce the recovery of oil. The residue buildup on the annular washers and toothed rings can become so severe that it will shorten the life of the annular washers and toothed rings, requiring more frequent replacement.

With the prior art, in order to reduce the buildup of the residue on the annular washers on the rolls, the oil extractor 20 (FIG. 2) is typically filled with a solution of 2% to 3% sodium or potassium hydroxide at a temperature of 130 F or lower. The oil extractor is allowed to run 30 to 60 minutes at this temperature to help loosen up the residues on the rolls. Final removal of the residues is by manually spraying 30 (FIG. 3) the top of the rolls with fresh water either using the existing plant water supply ranging from 40 to 60 psi or with high pressure hoses up to 3000 psi for complete cleaning.

A primary problem with the present, manual method of cleaning the rolls is that the extractor must be shut down for an extended amount of time. Downtime is expensive, especially during the processing season.

A significant problem with designing an automatic method for cleaning the rolls is the extractor require the use of pendulum pushers suspended above the rolls across which the citrus moves. Those pusher blades urge the citrus toward the discharge end of the extractor. Any automatic system for cleaning the rolls must also accomplish the function of the wipers (or pushers).

Ideally, any automatic cleaning system would be capable of being retrofitted onto existing extractors.

There are several additional problems with the prior art of cleaning the rolls. First, the annular washers are typically made of rigid polymeric material with very smooth surfaces but of low heat resistance, such as polyvinyl chloride, which limits the temperature and effectiveness of the caustic solution applied to the rolls. Temperatures of 140 F or higher, for example, can do irreversible damage to the rolls due to softening of the annular washers resulting in structural changes. A second problem is that the entire pan of the oil extractor 20 (FIG. 2) must be filled with the caustic solution to a level even with the top of the rolls to provide contact of the caustic solution to all surfaces on the rolls 10 (FIG. 2).

This results in an excessive volume of expensive caustic cleaning solution to be required for the sake of cleaning the rolls. In addition, this causes an additional expense and environmental problem having to neutralize and dispose of the caustic solution. A third problem is that there is generally not sufficient turbulence created in the narrow gap between the numerous annular washers and tooth rings during the caustic soaking to effectively remove all of the residue buildup 12 (FIG. 1A-1B). A fourth problem is that some of the waxy residues and waxy residue complexes require a temperature higher than 140 F to completely dissolve from the surface of the washers and toothed rings. A fifth problem is that, in order to effectively remove the residue after the caustic has loosened the residue, the rolls which contain the annular washers and tooth rings must be sprayed by manual labor with operator 30 (FIG. 3) using a high pressure water hose 32 (FIG. 3). This is a time consuming and potentially unsafe procedure in that the operator 30 (FIG. 3) must be located over the top of the oil extractor 20 (FIG. 3). The operator sprays down slowly across each roll 10 (FIG. 3), keeping the spray nozzle 31 (FIG. 3) close to the top of the roll and perpendicular to the roll 10 (FIG. 3) in order that the water penetrates into the narrow gaps between the washers and toothed rings with sufficient velocity to remove the residues. If high pressure is used it, is common practice that the extractor is not running, resulting in only a portion of the roll being cleaned.

Because the high pressure cleaning procedures are so time consuming, this cleaning is generally performed only a few times during the processing season resulting in significant buildup of residues on the surfaces of the annular washers and toothed rings. Frequent caustic cleaning is also sometimes avoided due to the time requirements and high cost of the caustic solutions. Thus there is a need for an apparatus which more effectively cleans the rolls to prevent residue buildup to increase the efficiency of the oil recovery, reduce chemical usage, reduce water usage, reduce downtime, reduce waste disposal, and improve safety during cleaning.

SUMMARY OF INVENTION

The invention overcomes the problems described above. It is an automatic overhead conveyor and wash system used to convey citrus fruit toward the extractor output as needed and to clean the rolls automatically. The preferred embodiment of the "conveyor and wash assembly" includes a pendulously suspended wiper bar assembly that is used as needed to contract citrus fruit on the rollers and convey that citrus fruit across said rollers as the wiper bar assembly advances to the output end of the extractor. The wiper bar assembly is the "conveyor" component of this embodiment of the invention. In this preferred embodiment, a spray manifold extends transversely across said extractor and is attached to sprocket drive chains. This spray manifold constitutes the "wash" component of the invention. The wiper bar assembly is pendulously suspended from the spray manifold. Hinged tracks on both sides of the extractor are provided which are utilized to raise the wiper bar assembly to a position where it can be retracted toward the input end of the extractor without contacting citrus fruit on the rollers. Citrus fruits may enter the extractor as the conveyor and wash assembly is retracted from the output to the input end of the extractor.

In a less preferred embodiment, a spray manifold operates as both the "conveyor" component and the "wash" component of the invention. The spray manifold is pendulously suspended from sprocket drive chains and is mounted at a position to contact and convey citrus fruit on the rollers to the output end of the extractor. The spray manifold also operates as the "wash" component of the invention.

The invention also includes the use of heat resistant polymers such as POMC or PVDF for annular washers to allow higher cleaning solutions and water temperatures to be used.

A primary object of the invention is to provide a system for automatically conveying citrus fruit on oil extraction rollers to the output end of the extractor as needed, and to automatically retract said conveyor or wiper to the input end of the extractor without contacting citrus fruit on the rollers.

Another object is to provide a citrus oil extractor in which during retraction of a conveyor or wiper to the input end of the extractor, citrus fruits may enter the extractor and move to the output end of the extractor by the rotation of the oil extraction rollers.

A further object is to provide a system for providing a "self-cleaning" or "clean in place" mode for applying cleaning solutions and/or water to extractor rollers to wash away unwanted residue from the rollers.

A further object is to provide a system that can be retrofitted onto existing extractors.

Another object is to utilize heat resistant polymers such as POMC or PVDF for annular washers to allow higher caustic temperatures to be used.

Further objects and advantages will become apparent from the following description and drawings

BRIEF DESCRIPTION OF DRAWINGS

FIGS. 1A and 1B show a prior art extractor roller 10 in FIG. 1A that has been fouled by residue and in FIG. 1B the same roller 10 after it has been cleaned;

FIG. 6A-6K are schematic "concept sketches," not to scale, which illustrate the operation of the invention;

DETAILED DESCRIPTION OF DRAWINGS

FIGS. 1A through FIG. 3 illustrate problems with the prior art. Those problems are described in detail above with reference to FIGS. 1A-FIG. 3.

As described above, FIG. 1A illustrates a prior art roller 10 with residue buildup on annular washers 11 and toothed rings 14 and FIG. 1B illustrates the same roller 10 after being cleaned and residue removed. This residue can have serious adverse effects on performance of the extractor, as described above in detail.

Figure 2:
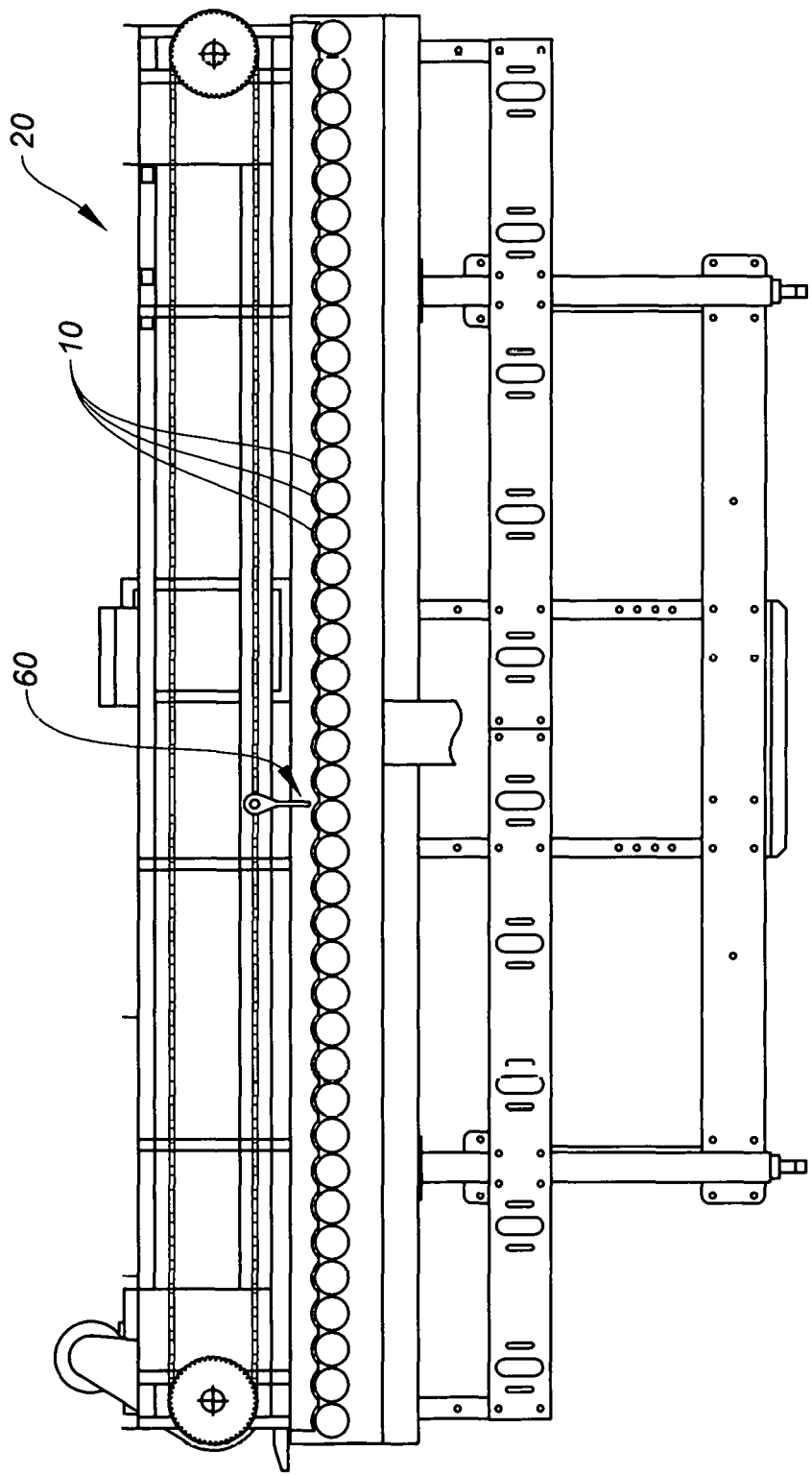
FIG. 2 is an elevational view of a prior art extractor to which the present invention may be retrofitted.

FIG. 2 illustrates a prior art extractor 20 as shown in U.S. Pat. No. 4,070,959 with a plurality of toothed rollers 10 and a wiper bar 60 for conveying citrus fruit through the extractor as needed. The chain carrying the wiper bar moves in one direction only with the sprockets turning clockwise as shown in FIG. 2.

Figure 3:
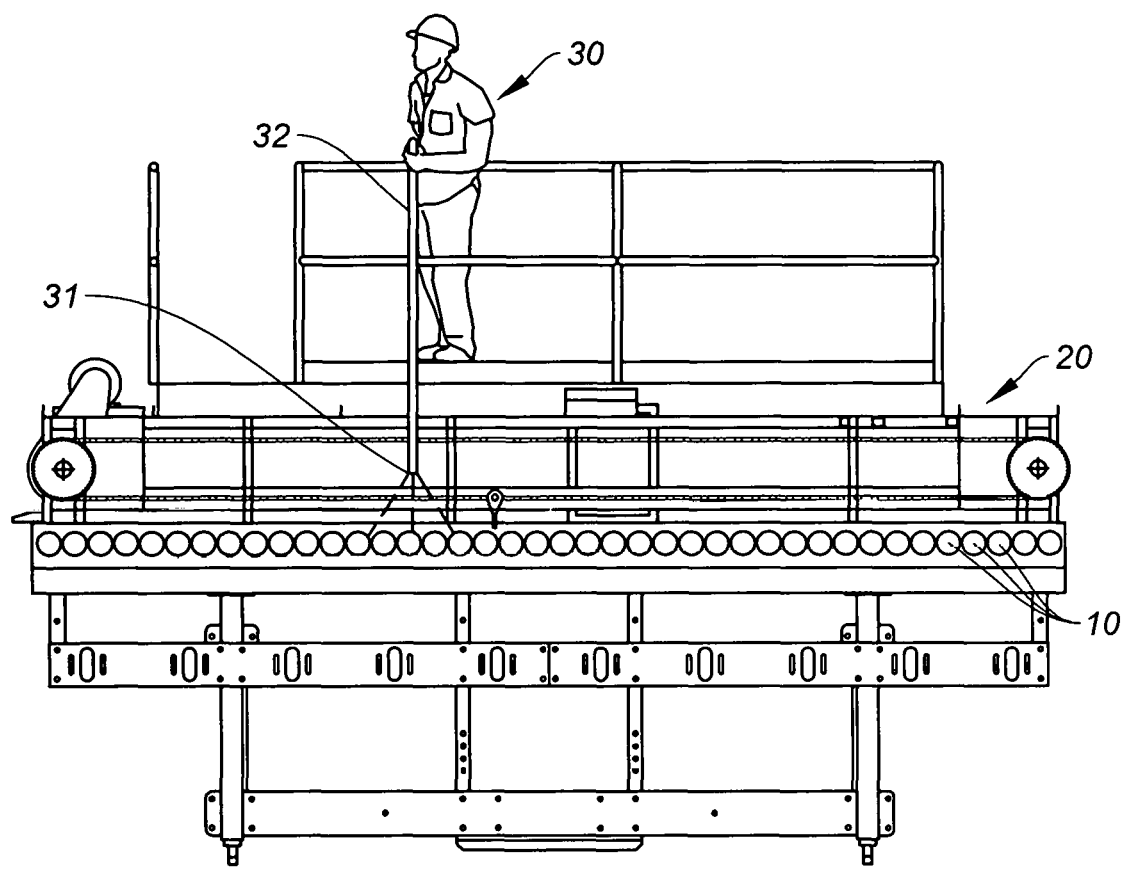
FIG. 3 is an elevational view of the prior art extractor shown in FIG. 2, in which a workman is shown as he prepares to manually clean the extractor rollers.

FIG. 3 illustrates how the prior art extractor 20 is manually cleaned by worker 30.

Figure 4A:
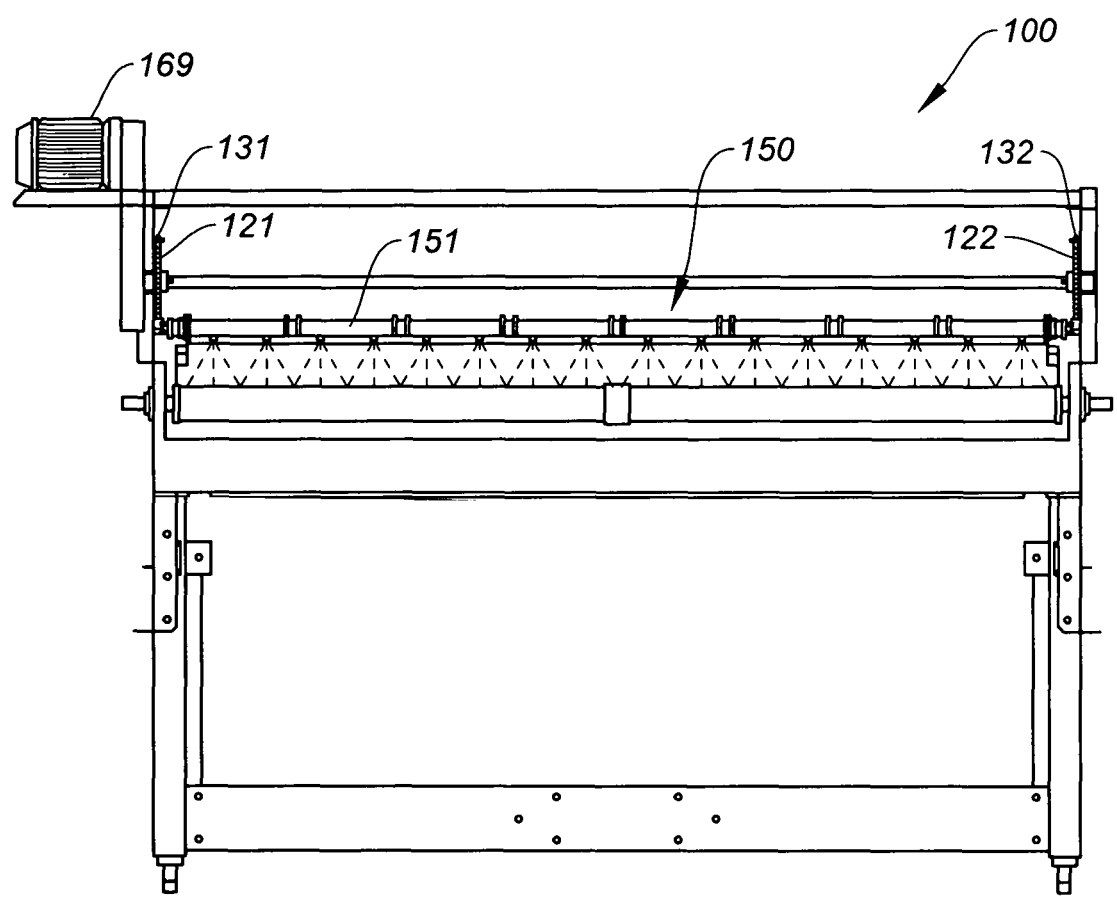
FIG. 4A is an elevational view of the invention in which a cleaning solution is being sprayed on the extractor rollers.
Figure 4B:
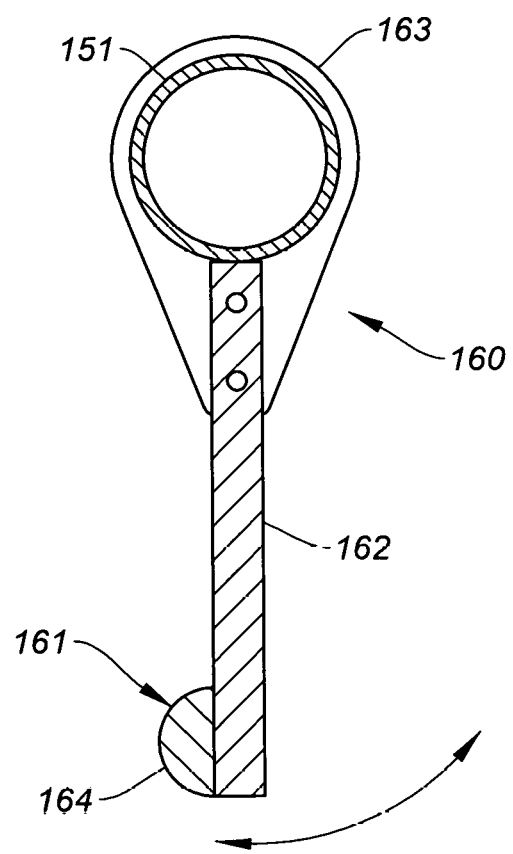
FIG. 4B is a limited sectional view of a portion of the preferred conveyor and wash assembly showing how the wiper bar assembly is pendulously carried by the spray manifold.
Figure 4C:
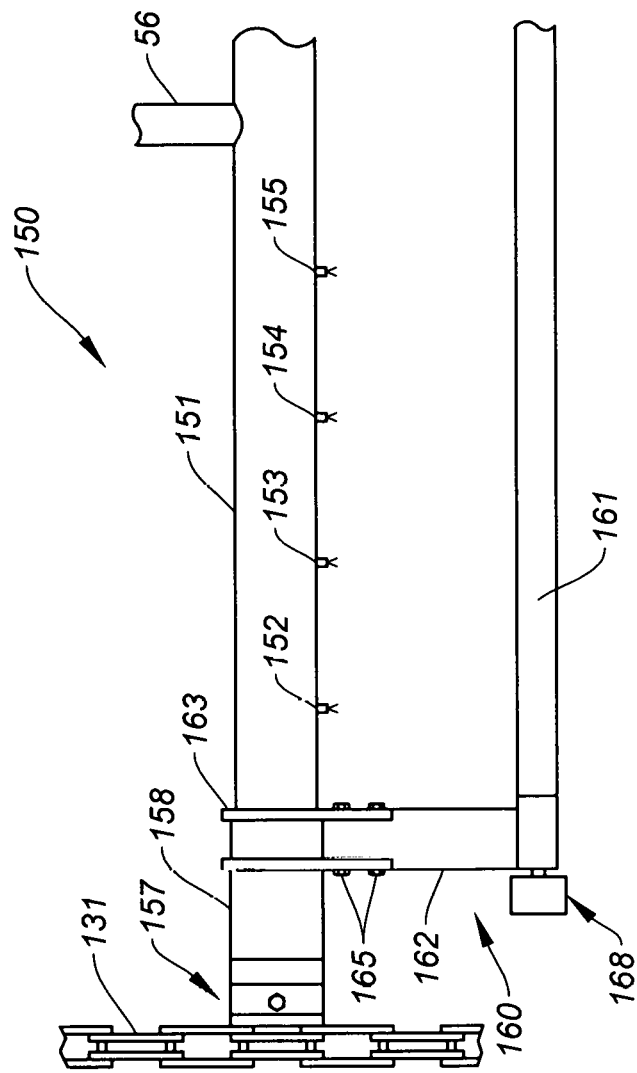
FIG. 4C is an elevational view of the preferred conveyor and wash assembly.
Figure 5A:
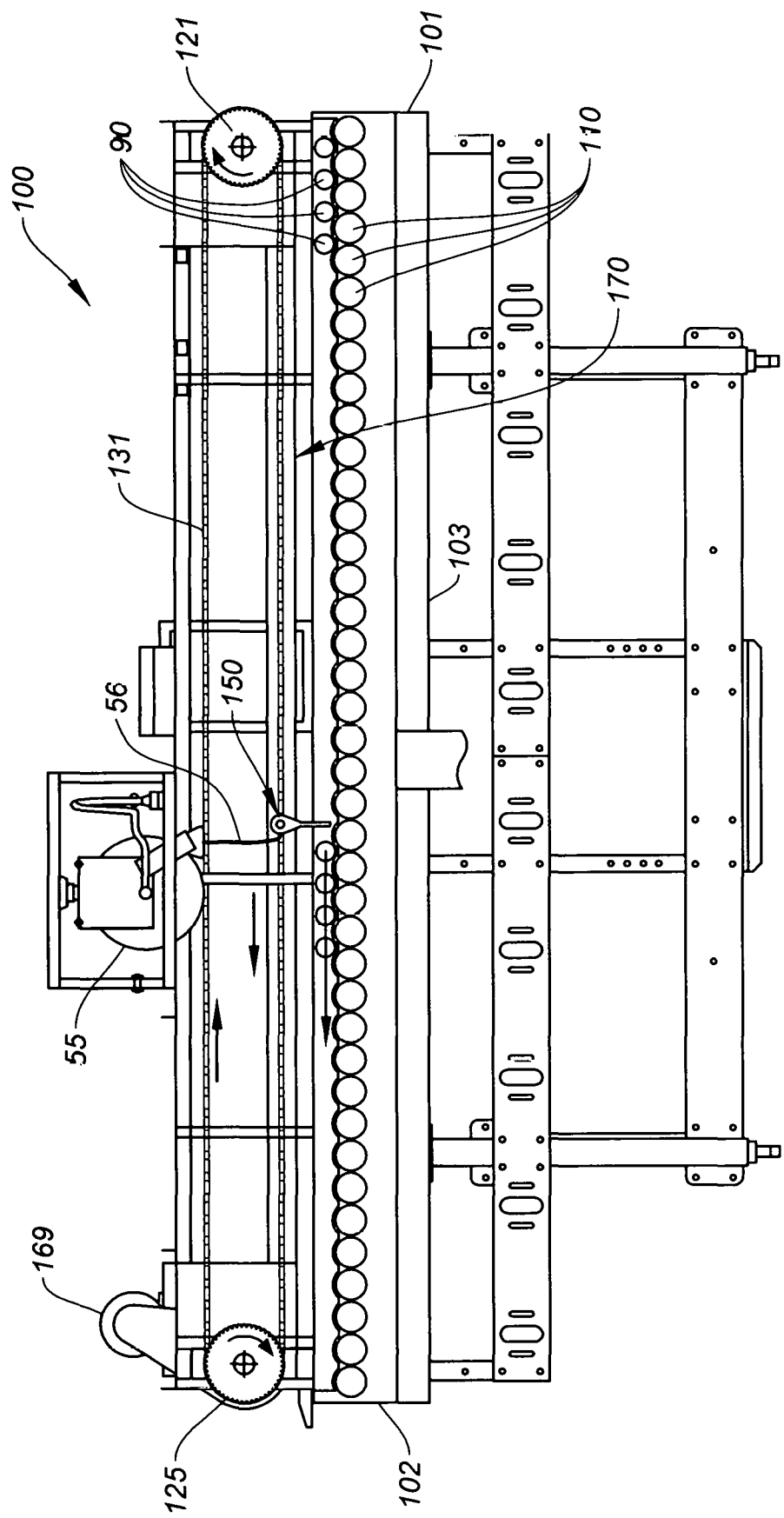
FIG. 5A is a side elevational view of the invention in which the conveyor and wash assembly is advancing toward the output end of the extractor.

FIGS. 4A-4C and 5A-5B illustrate the preferred embodiment of improved extractor 100. As shown in FIG. 5A, extractor 100 has an input end 101 into which citrus fruit 90 is introduced and an output end 102 through which the citrus fruit is discharged. Citrus fruits are not shown in FIGS. 4A-4C for clarity. A plurality of toothed rollers 110 (FIG. 5A) penetrates the oil glands of citrus fruits as known in the art.

Figure 5B:
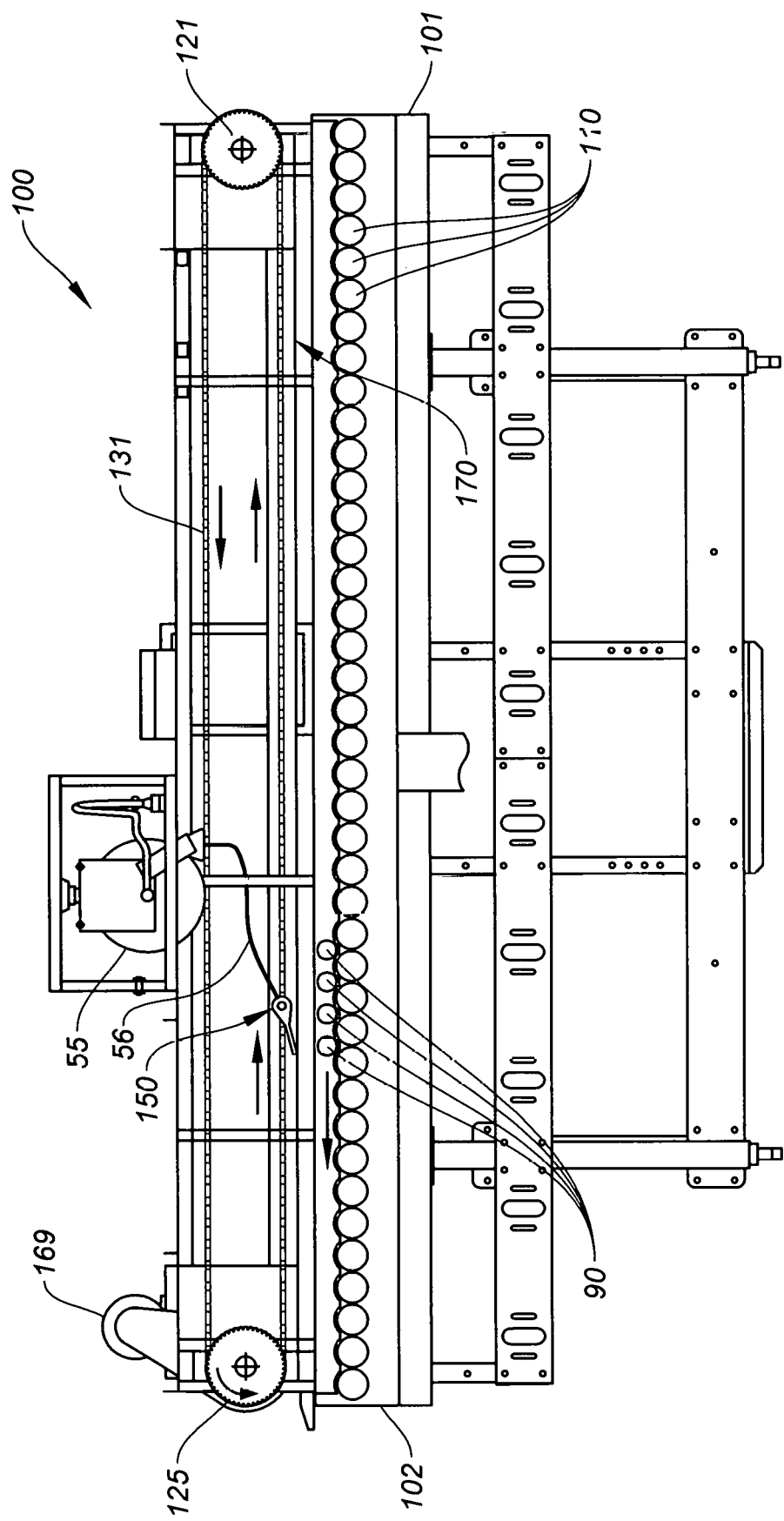
FIG. 5B is a side elevational view of the invention in which the conveyor and wash assembly is in its raised position and is being retracted toward the input end of the extractor without contacting citrus fruit on the extractor rollers.

A first pair of sprockets 121, 122 (Fig, 4A) are mounted above rollers 110 at input end 101 and a second pair of sprockets 125, 126 (FIGS. 5A-5B) are mounted above rollers (or rolls) 110 at output end 102. First and second drive chains or belts 131, 132 (FIG. 4A) are carried by the first and second pairs of sprockets. In FIGS. 5A-5B, only input end sprocket 121, output end sprocket 125 and drive chain or belt 131 are visible. Drive means 169 for all sprockets are designed to cause the sprockets to rotate in a first direction (clockwise as shown in FIG. 5A) or in a second direction (counterclockwise in FIG. 5B).

The spray manifold section 151 of the new overhead conveyor and wash assembly 150 (FIG. 4C) extends between and is carried by drive chains 131, 132 (or belts) (FIG. 4A).

FIGS. 4B-4C illustrate the components of the new conveyor and wash assembly 150 (FIGS. 5A-5B). FIG. 4B is a limited sectional view looking along the length of spray manifold 151 showing wiper bar assembly 160 pendulously carried by spray manifold 151. FIG. 4B is a limited sectional view in that it does not include wheel 168 or chain 131 and sprocket 121. Wiper bar assembly 160 includes a wiper bar 161 which extends horizontally and transversely across the width of extractor 100 (FIG. 4A). Wiper bar 161 (FIG. 4B) has a preferably convex surface 164 and is attached to several vertically extending wiper bar support arms 162. Each wiper support arm 162 is connected to a preferably plastic head 163 which is pendulously carried by spray manifold 151.

FIG. 4C is an elevational view showing spray manifold 151 with nozzles 152-155. The nozzles are of a fan type design and provide overlap of output sprays as shown in FIG. 4A. Nozzles 152-155 are not spraying in FIG. 4C, since wiper bar assembly is not in its raised position to avoid interfering with spray from the nozzles. Spray manifold 151 is connected to chain 131 by a connector 157 known in the art. A plastic spacer 158 is slidably carried by spray manifold 151. The preferably metallic support arm 162 is connected to plastic support head 163 by bolts 165. A wheel 168 is connected to support arm 162 at each lateral or transverse end of wiper bar 161 to cause wiper bar 161 to rotate to a raised position to avoid citrus fruit during retraction of the overhead conveyor and wash assembly 150 (FIG. 5B). The pair of wheels 168 contact hinged tracks 170 to raise the assembly 150, as shown and described in FIGS. 6D-6H below.

A flexible high pressure supply line or hose 56 is connected to spray manifold 151 to feed water or cleaning solution to the nozzles 152-155. A stainless hose support reel 55 (FIG. 5A) is mounted to the overhead extractor structure to carry line or hose 56. Hose reel 55 is a preferred hose support, but other hose supports may be utilized.

A sprocket drive means comprising an electric motor 169 is mounted above sprocket 125 (FIGS. 4A, 5A).

A series of "concept sketches" 6A-6K is provided to illustrate the operation of the improved extractor 100. The sketches are not to scale, include only some elements of the extractor, and exaggerate certain components to illustrate the invention. The sketches illustrate the operation of both embodiments of the invention described herein; namely the first embodiment shown in FIGS. 4A, 4B and 5A-5C and the second embodiment shown in FIGS. 8A and 8B.

Figure 6A:
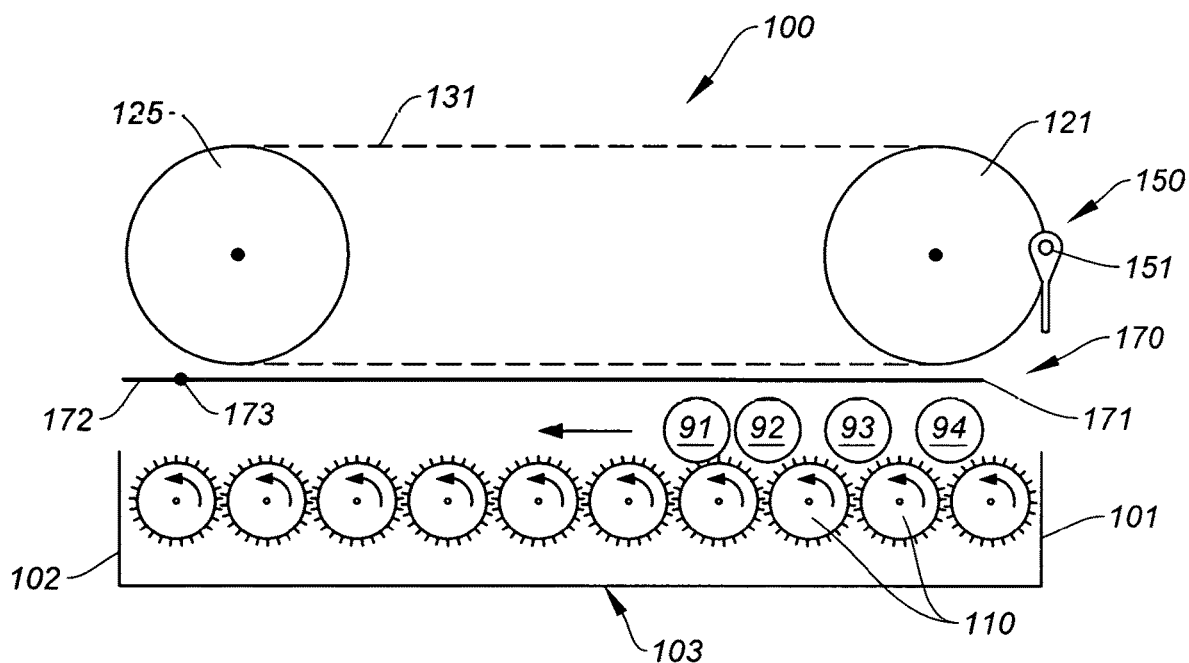

FIG. 6A illustrates the extractor 100 in a rest position. Sprockets 121 and 125 are stationary and chain 131 is not moving. Toothed rollers 110 are rotating in a counterclockwise direction to urge citrus fruit 91-94 from input end 101 of extractor 100 toward output end 102. Toothed rollers cause oil from citrus fruit 91-94 to drop into tank 103 as known in the art. As noted above, the conveyor and wash assembly 150 is only actuated when, for various reasons, citrus fruit remains on rollers 110 and needs to be conveyed to the output end 102 of extractor 100.

The overhead conveyor and wash assembly 150 is connected to chains 131 and 132 (not visible in FIG. 6A). It is shown being connected to sprocket 121 in the 3:00 o'clock position, but it is understood that a different rest position can be utilized.

Figure 6B:
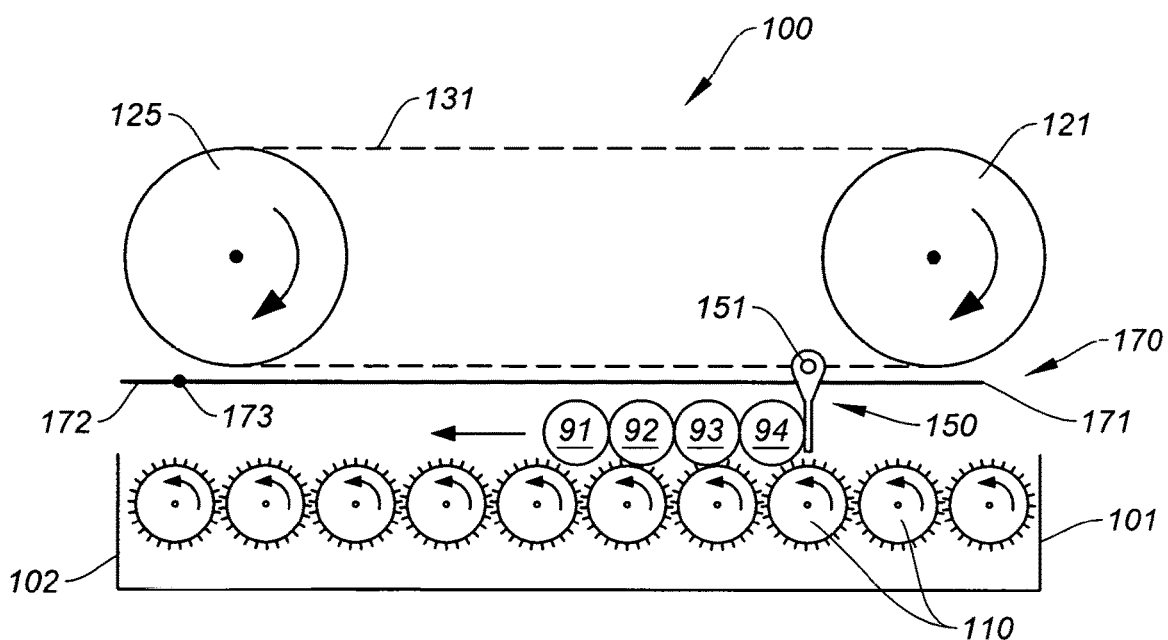

As shown in FIG. 6B, citrus fruit 91-94 needs to be conveyed to output end 102, and sprocket drive means 169 (not shown in FIG. 6B see FIG. 5A) has been actuated and sprockets 121, 125 rotate in a first direction, namely a clockwise direction. The conveyor and wash assembly 150 is lowered to the position shown in FIGS. 5A, 6B and 6C wherein it contacts citrus fruit and advances in a direction from input end 101 of extractor 100 toward output end 102. Assembly 150 pushes or conveys those citrus fruits 91-94 toward output end 102.

Figure 6C:
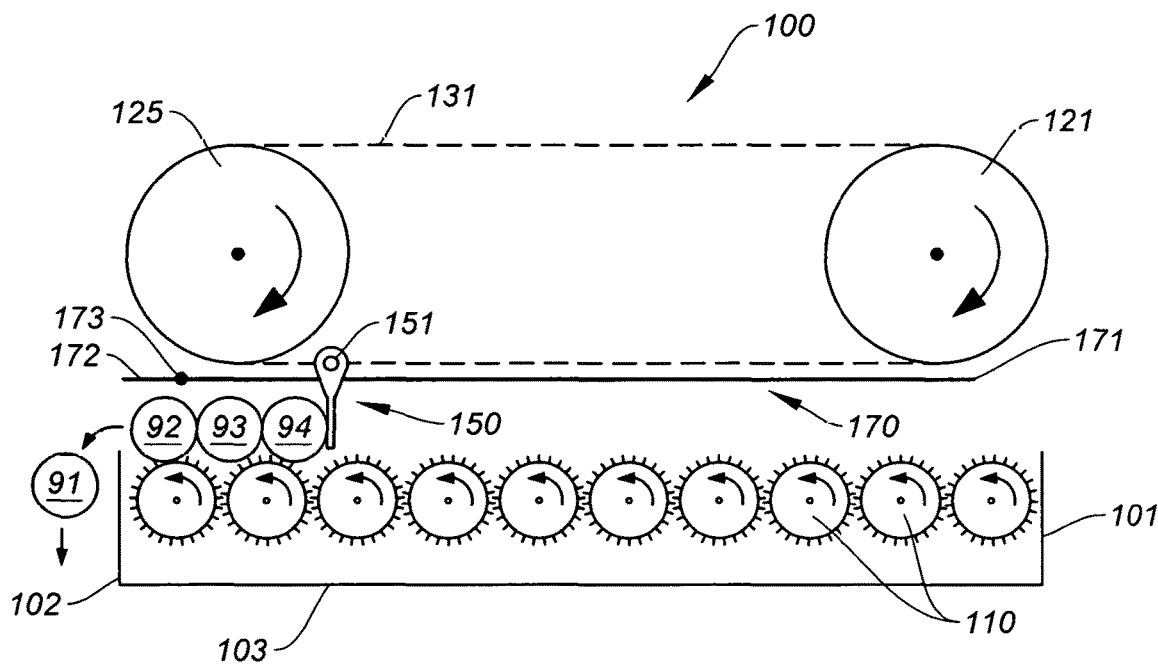

In FIG. 6C, conveyor and wash assembly 150 has advanced close enough to output end 102 to cause the discharge of citrus fruit 91 from the extractor 100.

Figure 6D:
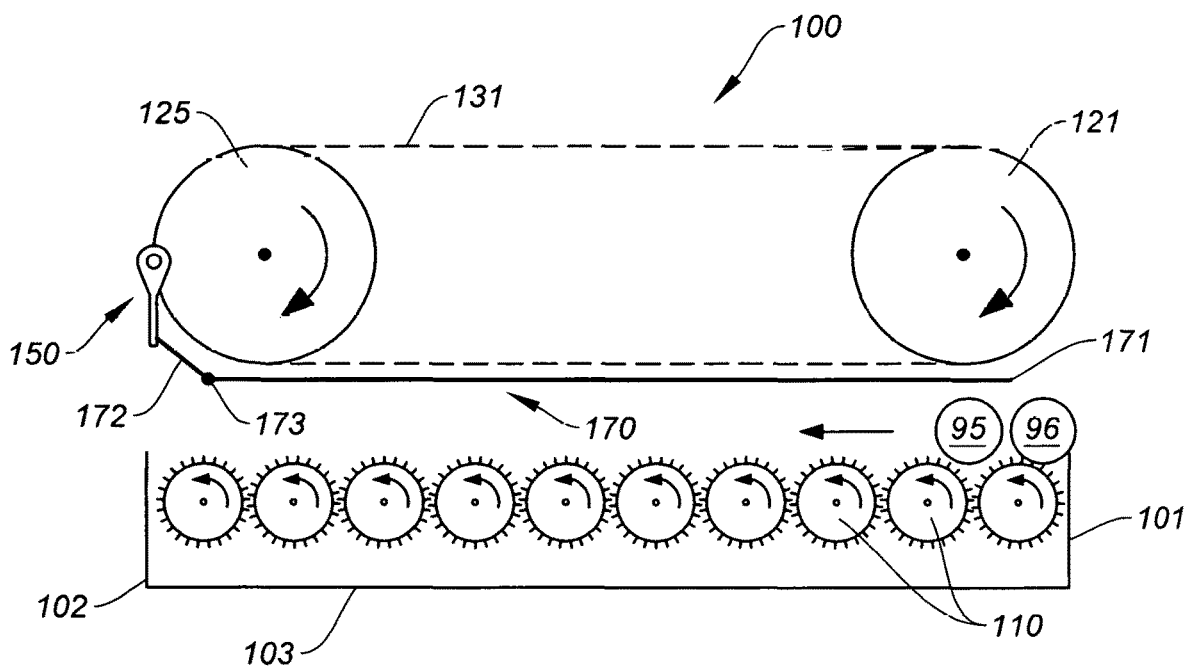

In FIG. 6D, the conveyor and wash assembly 150 has nearly reached the 9:00 o'clock position of sprocket 125 (different sprocket positions may be utilized). A pair of tracks 170 are mounted on each side of extractor 100, each extending from a position above the input end 101 to the output end 102 of extractor 100. A segment 172 of track 170 above output end 102 is hinged at hinge 173. The hinged segment is rotated upwardly by conveyor and wash assembly 150 as shown in FIG. 6D. Citrus fruit 95, 96 have entered input end 101.

Figure 6E:
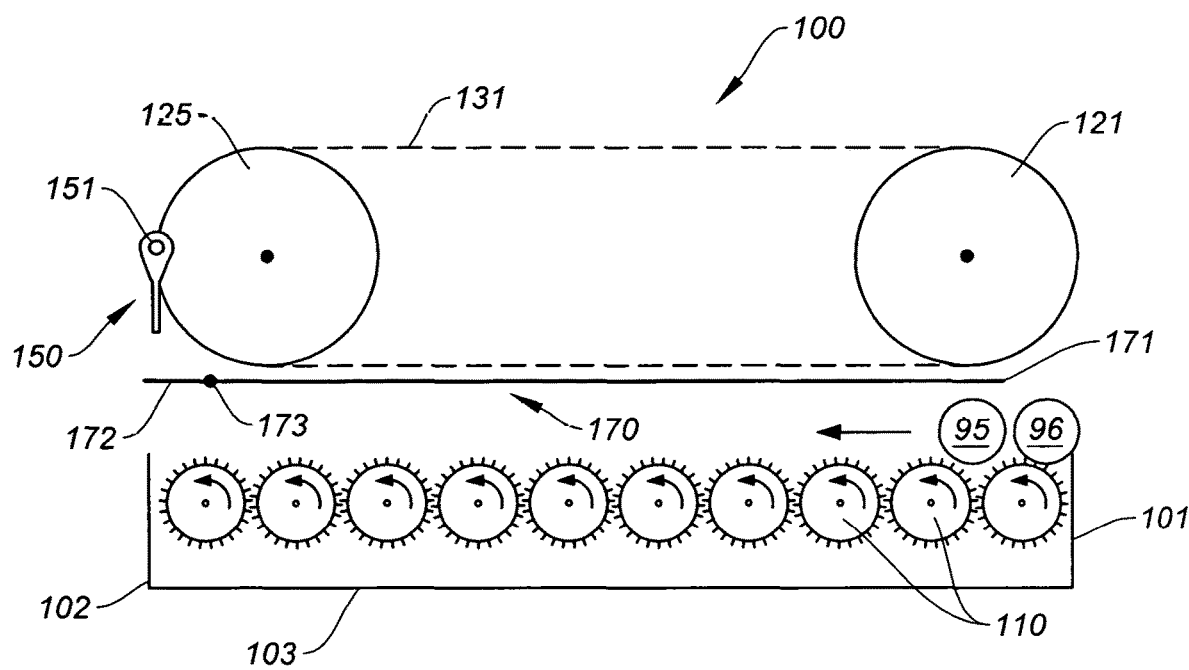

In FIG. 6E, the conveyor and wash assembly 150 has reached the 9:00 o'clock position of sprocket 125 (other positions could be used) and the hinged segments 172 of track 170 (on both sides of extractor 100) have returned to a horizontal position. Conveyor and wash assembly 150 contacts a switch (not shown for clarity) at the position shown in FIG. 6E which momentarily stops the rotation of sprockets 121 and 125, and causes the sprockets to rotate in a second direction, namely in a counterclockwise direction shown in FIG. 6F. Citrus fruits 95-96 enter input end 101.

Figure 6F:
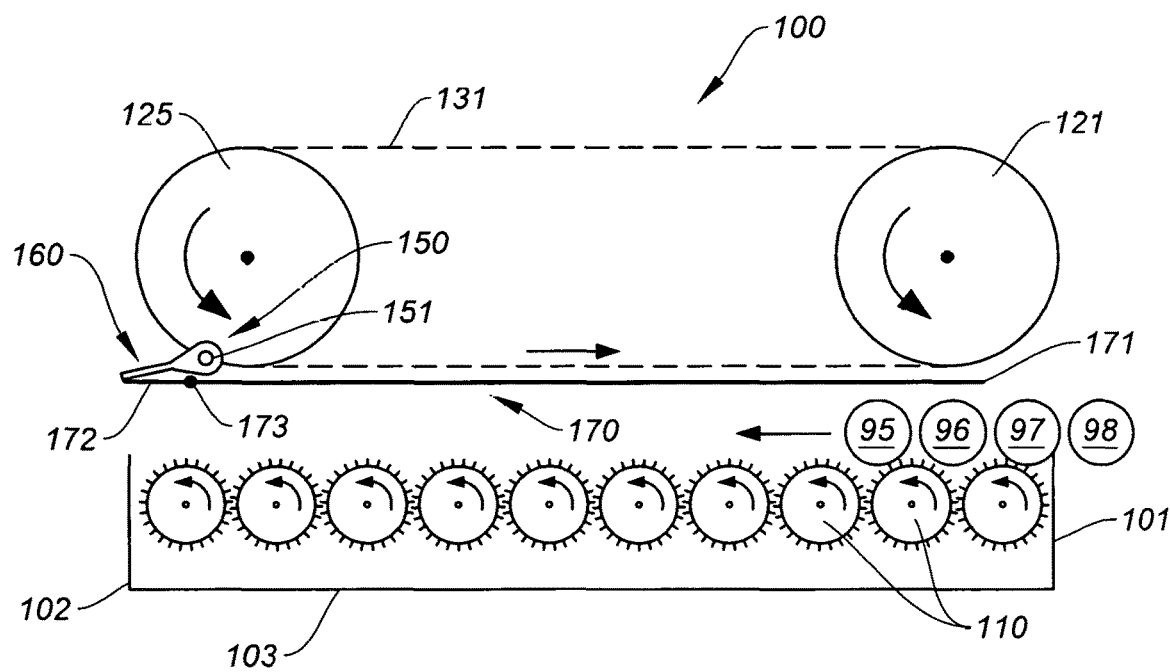

As shown in FIG. 6F, sprockets 121 and 125 have started to rotate in a direction to retract conveyor and wash assembly 150 to input end 101. Conveyor and wash assembly 150 reaches a position where wheel 168 (FIG. 4C, not shown in FIG. 6F for clarity) has contacted track 170. This contact with track 170 causes the wiper bar assembly 160 (FIG. 4C) to move to a raised position by rotating clockwise relative to spray manifold 151. Citrus fruits 95-98 are entering input end 101.

Figure 6G:
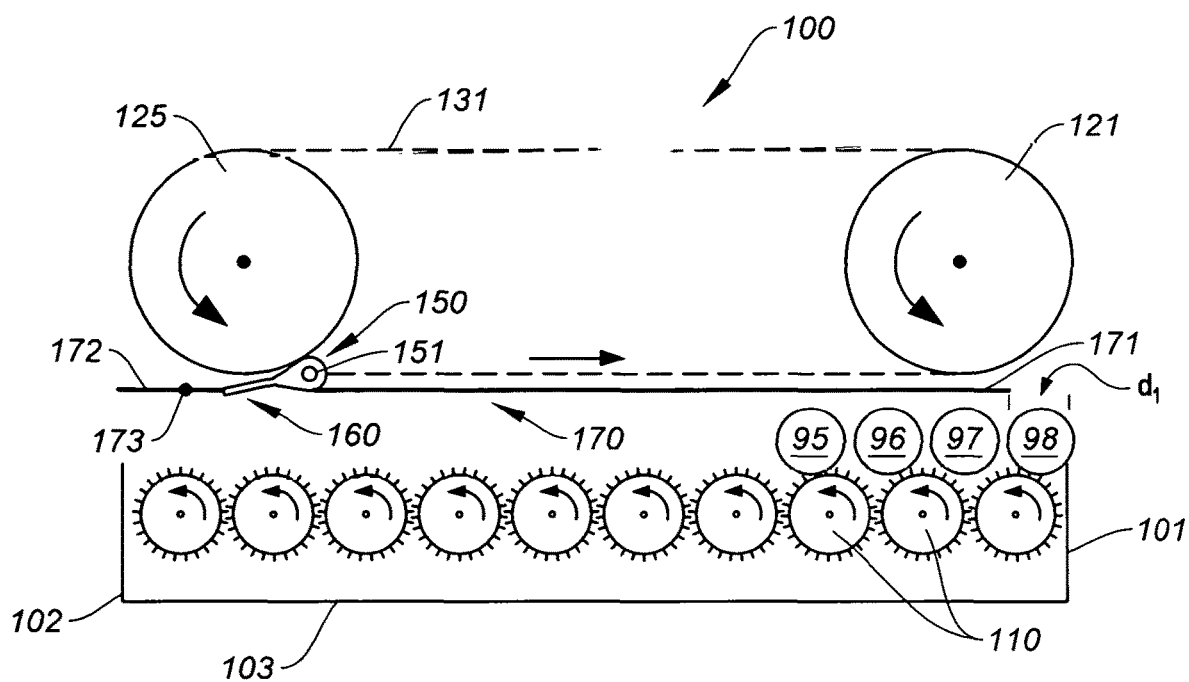

As shown in FIG. 6G, conveyor and wash assembly 150 retracts further toward input end 101 as citrus fruits 95-98 move toward output end 102, caused by rotation of rollers 110.

The input end 171 of track 170 is a sufficient distance $d_1$ from input end 101 of the extractor to allow wheel 168 to move upwardly and downwardly past the input end 101 of track 170 without contacting the track.

Figure 6H:
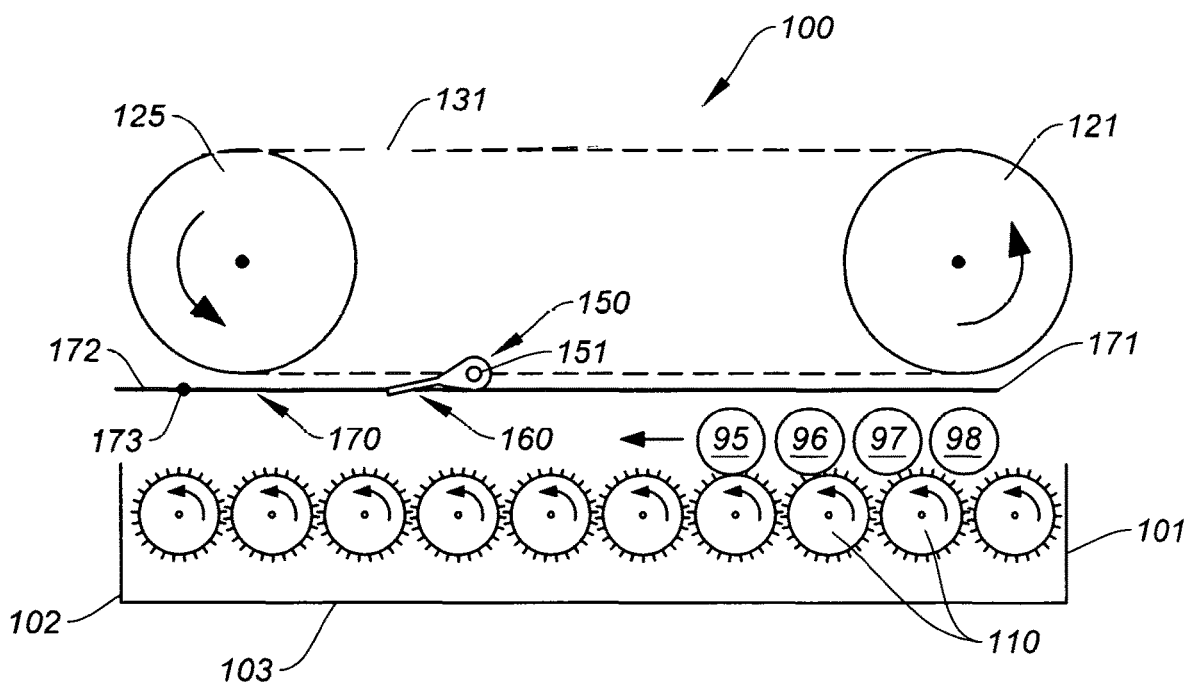

As shown in FIG. 6H, wiper bar assembly 160 is shown in its raised position during retraction of conveyor and wash assembly 150 toward input end 101 to avoid contact between wiper bar assembly 160 and citrus fruits 95-98 on rollers 110.

Figure 6J:
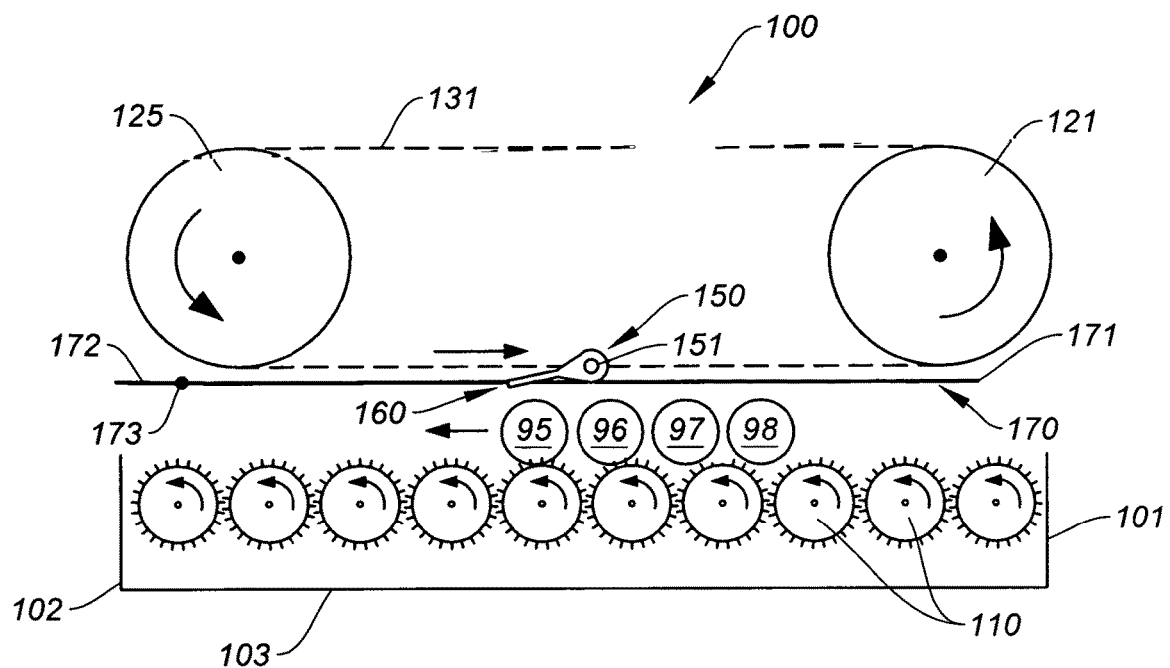

In FIG. 6J, conveyor and wash assembly 150 is shown being retracted toward input end 101 with wiper bar assembly 160 in its raised position to avoid contact with citrus fruits 95-98 as those fruits move toward output end 102.

It is significant to note that, as shown in FIGS. 6E-6K, as conveyor and wash assembly 150 is retracted, citrus fruits such as 95-98 may be moved through extractor 100 by rotation of rollers 110.

In the first mode of operation shown in FIGS. 6A-6K, no fluids are passed through nozzles carried by spray manifold 151.

Figure 6K:
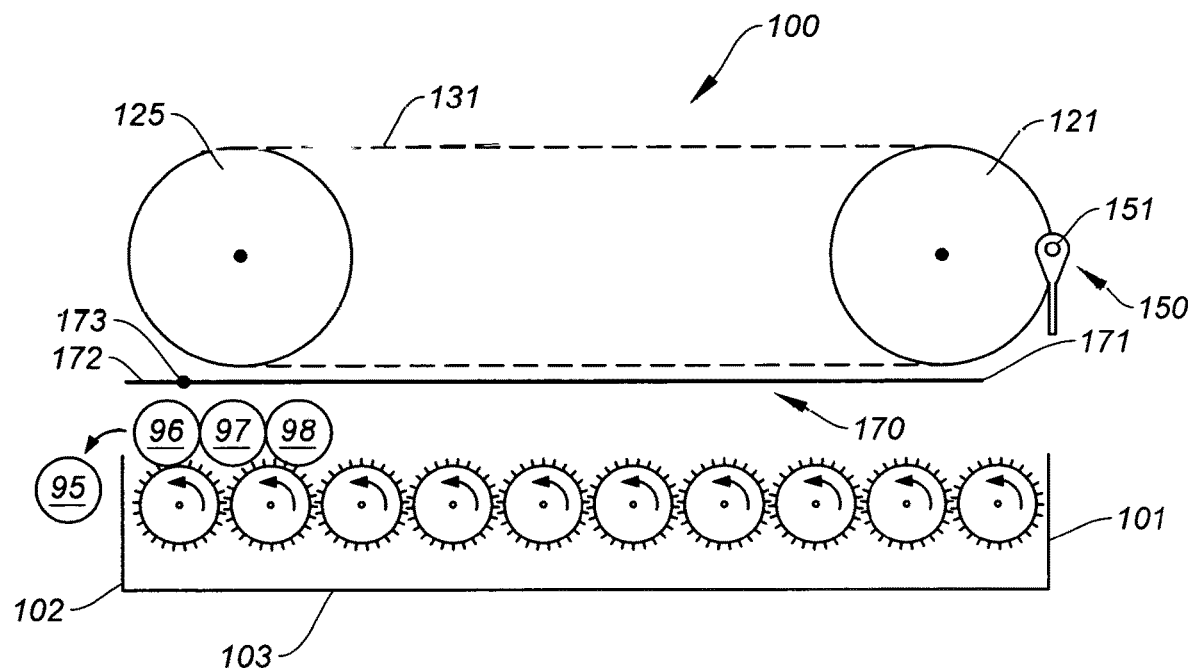

In FIG. 6K, conveyor and wash assembly 150 has reached its rest position shown in FIG. 6A, at which point it contacts a switch which stops rotation of sprockets 121, 125.

It is significant to note that the prior art mechanism shown in U.S. Pat. No. 4,070,959 rotates the sprockets in one direction only. The present invention rotates the sprockets in different directions to advance or retract the conveyor and wash assembly 150.

FIGS. 7A-7D illustrate a second mode of operation for the preferred embodiment shown in FIGS. 4A-4C and 5A-5B, which is a "self-cleaning" or "clean in place" mode.

Figure 7A:
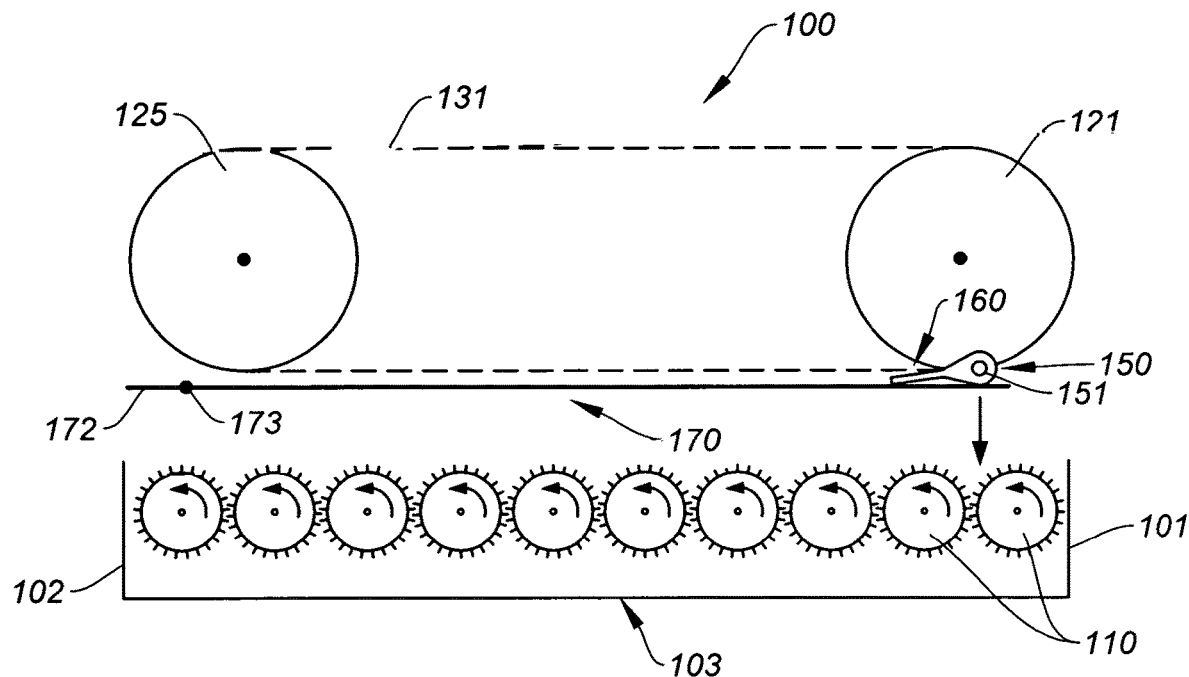
FIGS. 7A-7D are schematic "concept sketches" illustrating the "self-cleaning" or "clean in place" mode in which a caustic solution is applied to the extractor rollers.

FIG. 7A illustrates preparation and start of this mode. The conveyor and wash assembly 150 is first moved to the position shown in FIG. 6H wherein the wiper bar assembly 160 is rotated by wheels 168 (not visible in FIG. 7A) into its raised position. The conveyor and wash assembly is then moved to the starting position shown in FIG. 7A. All citrus fruits are discharged from extractor 100 and the water tank 103 is emptied. Fluid pressure is built up in spray manifold 151 to a desired level. The rollers 110 rotate at a reduced speed. In its raised position shown in FIGS. 6H and 7A, the wiper bar assembly 160 is not contacted by fluids passing through the nozzles of spray manifold 151. The spraying of cleaning solutions (including caustics and sanitizers, without limitation) and/or water begins as shown by arrows in FIG. 7A, with spray manifold 151 in the 5:00 o'clock position of sprocket 121.

Figure 7B:
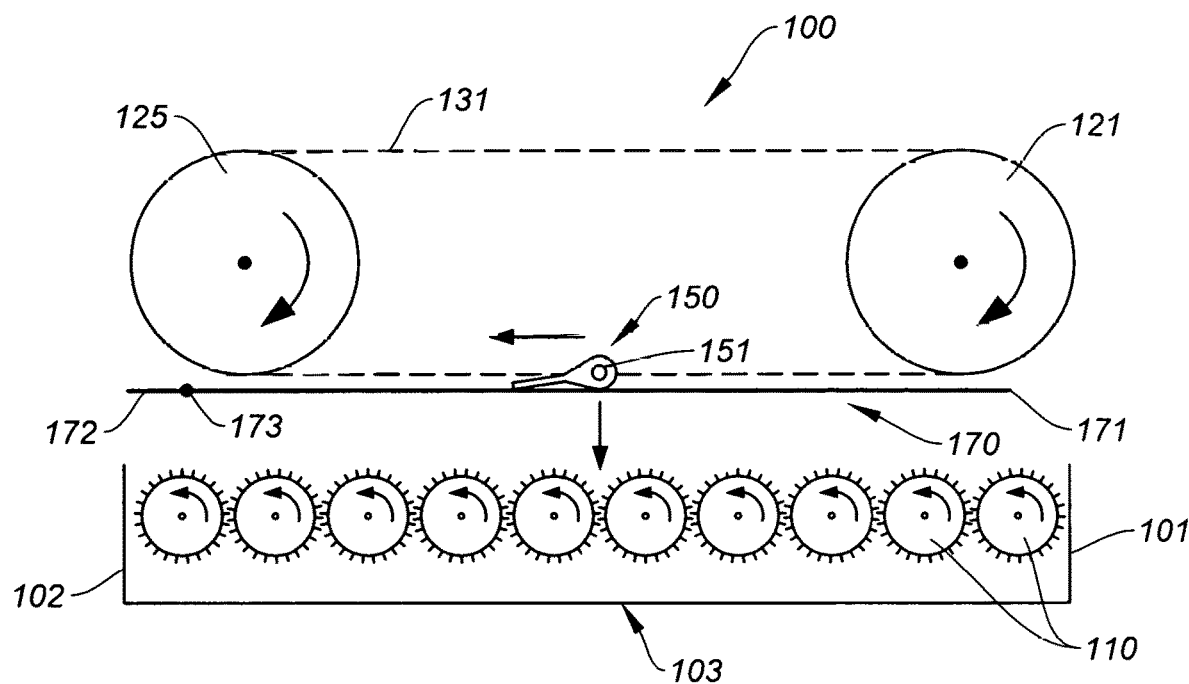

In FIG. 7B, the sprockets 121, 125 rotate in a clockwise direction to advance the conveyor and wash assembly 150 toward output end 102.

Figure 7C:
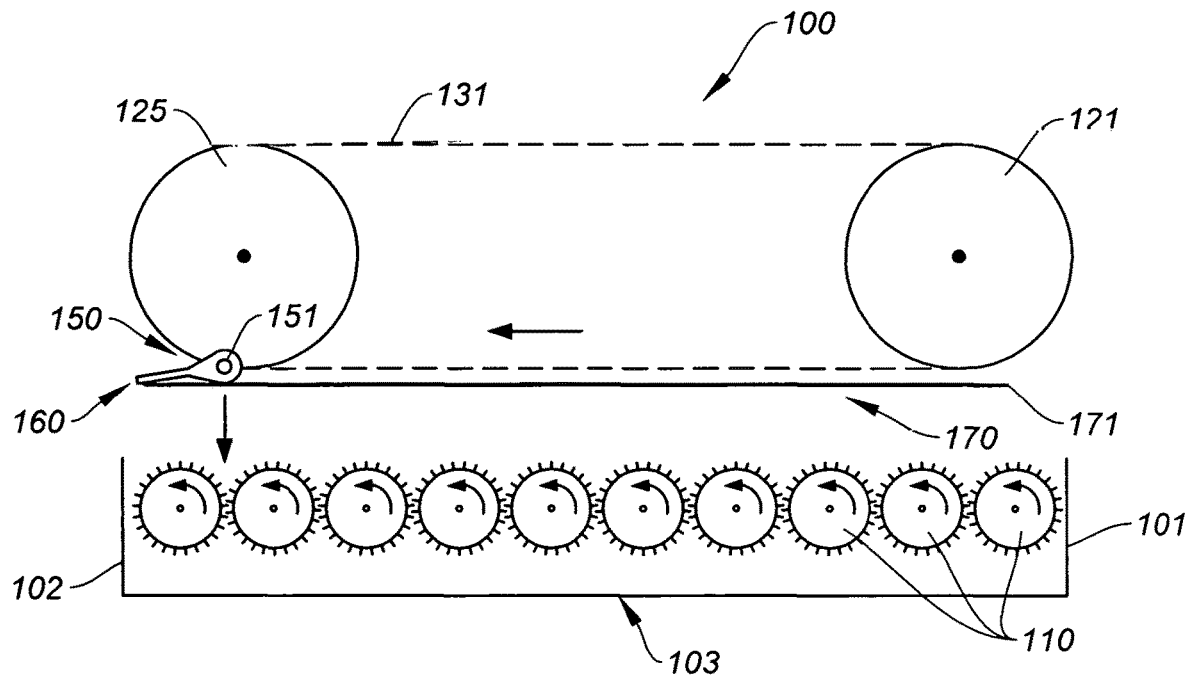

As shown in FIG. 7C, when spray manifold 151 reaches the 7:00 o'clock position of sprocket 125, the sprockets 121, 125 are stopped momentarily as shown.

Figure 7D:
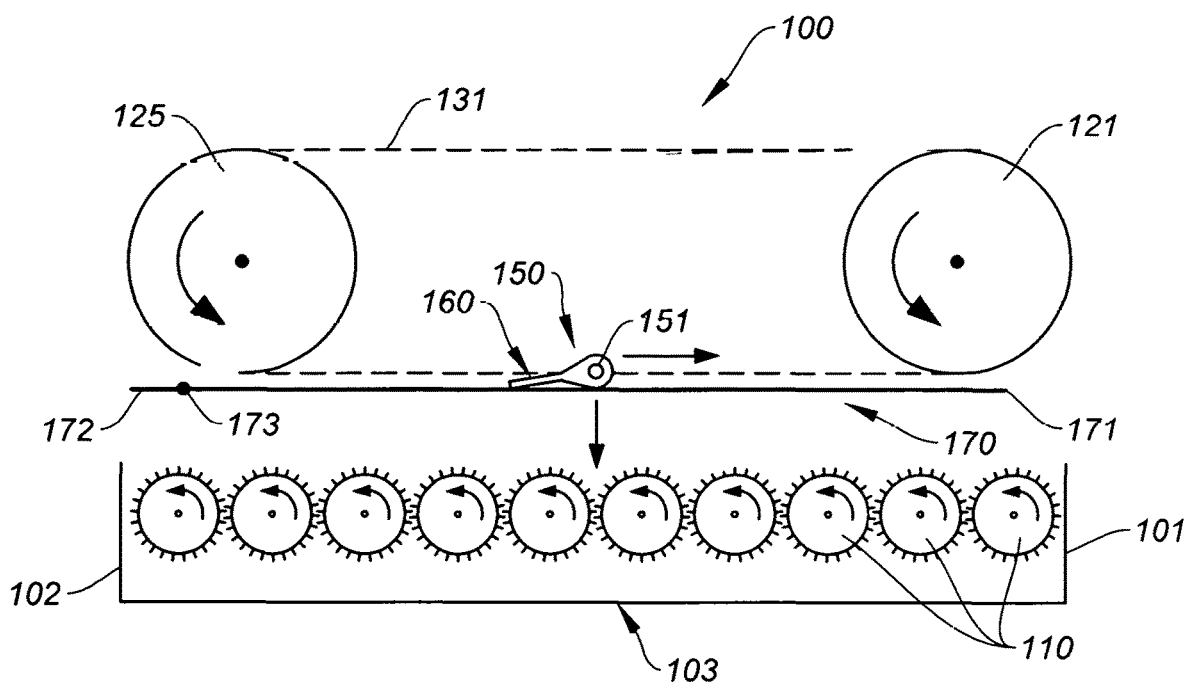

As shown in FIG. 7D, sprockets 121, 125 rotate in a counter clockwise direction, and the conveyor and wash assembly 150 retracts toward the input end 101. When spray manifold 151 reaches the 5:00 o'clock position of input end sprocket 121 as shown in FIG. 7A, the sprockets 121, 125 reverse direction. This cycle shown in FIG. 7A-7D is repeated until the rollers 110 have been cleaned.

Once the cleaning cycle shown in FIGS. 7A-7D is complete the conveyor and wash assembly 150 will stop back at the 5 o'clock position at the inlet sprocket 121 allowing necessary contact time for the cleaning solution to soften residue build-up. The next sequence in the cycle, is a high pressure rinse, typically 125-500 psi with fresh water. The conveyor and wash assembly 150 will travel across the oil extractor rolls 110 one or more times as required to effectively remove cleaning solutions and residues. Once the rinse cycle is complete, the conveyor and wash assembly 150 returns to its rest position (FIG. 6A) at the 3 o'clock position of the inlet sprocket 121 and stops. At this point the machine is ready to resume normal operation. With this invention, there will not be a need for personnel to hand clean the rolls in an unsafe manner.

The invention includes the use of heat resistant polymers such as POMC or PVDF for annular washers to allow higher caustic temperatures to be used for better cleaning of residue from the annular washers in rollers 110.

Figure 8A:
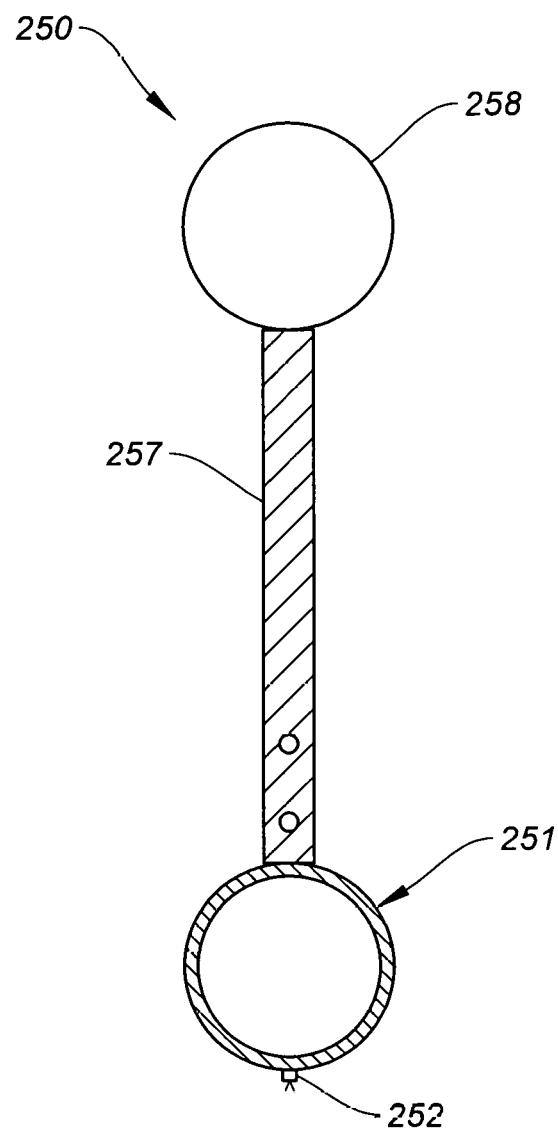
FIG. 8A is a limited sectional view of a less preferred, second embodiment of the invention.
Figure 8B:
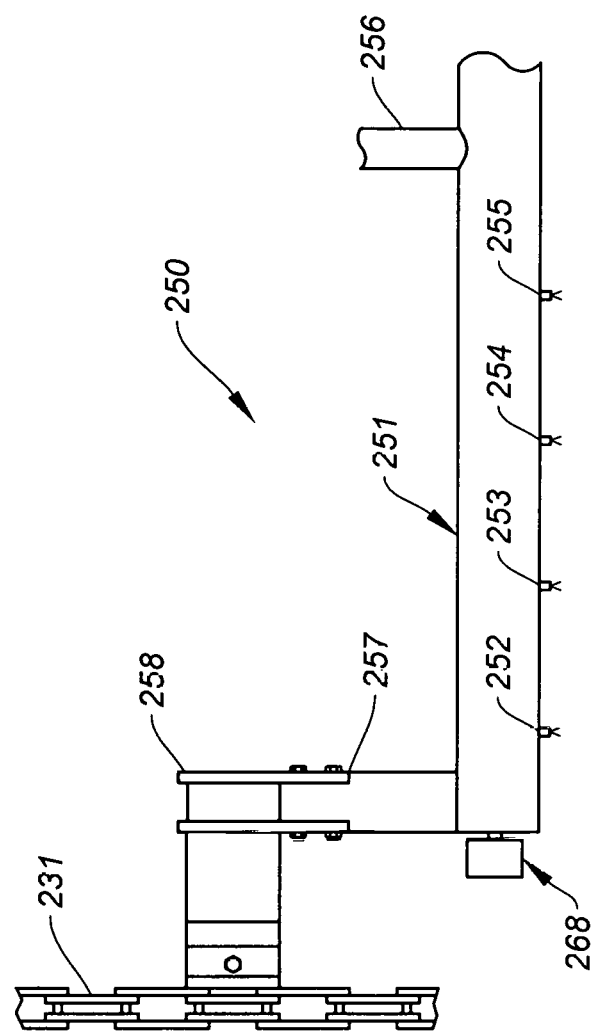
FIG. 8B is an elevational view of the apparatus of FIG. 8A.

FIGS. 8A and 8B are "concept sketches" of a less preferred embodiment of the invention compared to the embodiment shown above. FIG. 8A is a limited sectional view of part of FIG. 86 in that it does not include the chain 231 or the sprocket carrying chain 231. The conveyor and wash assembly 250 shown in FIG. 8A uses the spray manifold 251 to act as a wiper or conveyor bar and to perform the wash function by spraying cleaning solutions (including caustics and sanitizers without limitation) and/or water through nozzle 252 on the rollers. The spray manifold 251 extends across the width of the extractor, carries a plurality of nozzles, and is pendulously carried from the sprocket chains or belts by support arms 257 and chain connectors 258 which have swiveling members connected to the sprocket drive chains. Nozzles such as 252 are carried beneath manifold 251. Wheels 268 (FIG. 8B) at both ends of spray manifold 251 engage hinged track 170 (not shown in FIG. 8B) to move spray manifold 251 to a raised position to allow it to be retracted to input end 101 of extractor 100 without contacting citrus fruit on rollers 110. The pendulous mounting to the sprocket drive chains maintains the position of spray manifold 251 vertically beneath connectors 258.

Figure 9:
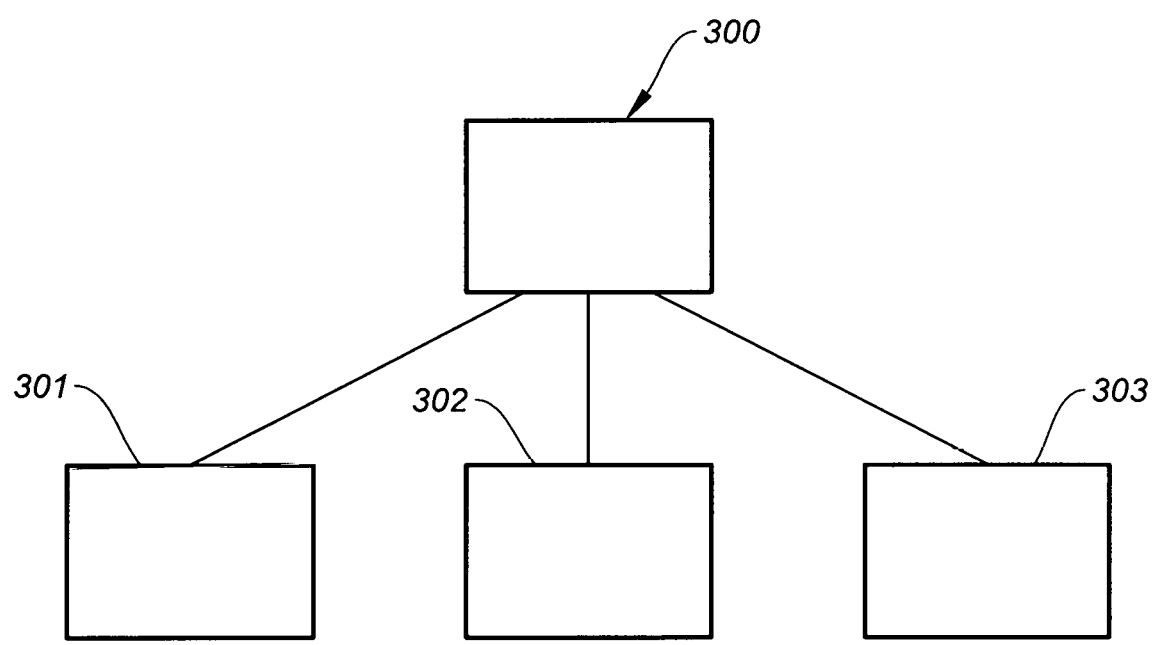
FIG. 9 is a schematic illustrating the control system.

FIG. 9 is a block diagram of the control system for the new extractor. The main control system 300 controls the speed of the extractor rollers at roller drive means 301, the speed and direction of sprockets at 302 and actuation of the spray nozzles at 303.

As used herein and in the claims, the phrase "means for moving said overhead conveyor and wash assembly to a raised position" refers to the interaction of wiper bar assembly 160, hinged track 170, and wheels 168 on both ends of wiper bar assembly 160 in the preferred embodiment shown in FIGS. 4A-4C and 5A-5B. That phrase refers to spray manifold 251, wheels 268 on both ends of spray manifold 251, and hinged track 170 in the second embodiment shown in FIGS. 8A-8B.

As used herein and in the claims, the phrase "means for moving said overhead conveyor and wash assembly to a lowered position" refers to wheels 168 and the position of input end 171 of track 170 allowing the conveyor and wash assembly to move downwardly from the position shown in FIG. 6A to the position shown in FIG. 6B without wheels 168 engaging track 170, in the preferred embodiment of FIGS. 4A-4C and 5A-5B. That phrase refers to wheels 268 and the same position of input end 171 of track 170 in the second embodiment shown in FIG. 8A-8B.

The foregoing description of the invention has been presented for purposes of illustration and description and is not intended to be exhaustive or to limit the invention to the precise form disclosed. Modifications and variations are possible in light of the above teaching. The embodiments were chosen and described to best explain the principles of the invention and its practical application to thereby enable others skilled in the art to best use the invention in various embodiments suited to the particular use contemplated.

The invention claimed is:

1. An apparatus for automatic extraction of oil from the peel of whole citrus fruit, wherein said apparatus includes an input end and an output end, a plurality of parallel toothed rollers between said input and output ends, each of said rollers having a plurality of teeth for penetrating oil glands of said peel of said citrus as said citrus passes over said rollers, roller drive means for causing rotation of said plurality of rollers, a first pair of sprockets mounted above and on each side of said rollers at said input end and a second pair of sprockets mounted above and on each side of said rollers at said output end, and first and second drive chains or belts carried by said first and second pairs of sprockets, characterized by an overhead conveyor and wash assembly extending between and carried by said drive chains or belts, said assembly including a spray manifold with a plurality of nozzles directed downwardly toward said rollers, a supply line or hose for high pressure liquid connected to said spray manifold, sprocket drive means capable of causing said sprockets to rotate in a first direction to cause said conveyor and wash assembly to advance toward said output end and cause any citrus fruit on said rollers to advance to said output end, said sprocket drive means capable of causing said sprockets to rotate in a second direction to retract said conveyor and wash assembly to said input end, means capable of moving said overhead conveyor and wash assembly to a lowered position for advancement of said assembly to said output end of said extractor, wherein contact between said assembly and citrus fruits on said rollers is made and said citrus fruit is conveyed to said output end of said extractor, means capable of moving said overhead conveyor and wash assembly to a raised position for retraction of said assembly to said input end of said extractor, wherein contact between said assembly and citrus fruits on said rollers is prevented, control means capable of actuating said rollers, sprockets and nozzles whereby said conveyor and wash assembly may be utilized in two modes of operation, including:

a) A first mode in which said extractor rollers operate and said conveyor and wash assembly is capable of being actuated as necessary to convey citrus fruits toward said output end, and b) A second mode in which citrus fruit is removed from said extractor, said conveyor and wash assembly is capable of advancing and retracting between said input and output ends, and cleaning fluids are capable of passing through said nozzles to clean said rollers.

2. The apparatus of claim 1 in which said wash assembly has a rest position in which it remains stationary at said input end and said rollers are capable of operation to transfer said citrus fruit through said extractor.

3. The apparatus of claim 1 wherein in said second mode of operation, said rollers are capable of being rotated at a reduced speed.

4. The apparatus of claim 1 further comprising a wiper bar assembly pendulously suspended from said spray manifold.

5. The apparatus of claim 4 further comprising means for moving said wiper bar assembly to a raised position during retraction of said conveyor and wash assembly to avoid contact between said wiper bar assembly and citrus fruit on said rollers.

6. The apparatus of claim 5 wherein said means for moving said wiper bar assembly to a raised position and maintaining that position during retraction includes a pair of tracks mounted on each side of said extractor and a pair of wheels mounted on each lateral end of said wiper bar assembly, wherein each of said pair of tracks has a hinged section to allow said wheels of said wiper bar assembly to move to a position above said tracks.

7. The apparatus of claim 1 wherein said sprockets carry drive chains, and wherein said conveyor and wash assembly comprises:

a spray manifold pendulously suspended from said drive chains by support arms, and wherein said spray manifold is positioned to contact citrus fruit on said rollers as said spray manifold advances toward said output end of said extractor to convey said citrus fruit through said extractor.

8. The apparatus of claim 7 comprising means for moving said spray manifold to a raised position during retraction to avoid contact with citrus fruit on said rollers.

9. The apparatus of claim 1 wherein said rollers include annular washers and toothed rings, and wherein said annular washers are made of POMC or PVDF heat resistant polymers.

10. The apparatus of claim 1 further comprising a support for said supply line or hose.

11. The apparatus of claim 1 wherein said support is a stainless steel hose reel.

12. The apparatus of claim 1 wherein said conveyor and wash assembly is capable of being retracted toward said input end, and citrus fruits are capable of entering said input end of the extractor and be moved to said output end by rotation of said rollers.

13. The apparatus of claim 1, wherein no fluids are passed through said nozzles during said first mode of operation.

14. The apparatus of claim 1, wherein said conveyor and wash assembly is capable of advancing and retracting repeatedly until said rollers are cleaned.

* * * * *